United States Patent
Hochgatterer et al.

(10) Patent No.: US 9,653,733 B2
(45) Date of Patent: May 16, 2017

(54) ELECTRODES AND LITHIUM-ION CELLS WITH A NOVEL ELECTRODE BINDER

(75) Inventors: Nikolaus Stefan Hochgatterer, Graz (AT); Stefan Koller, Graz (AT); Mario Rene Schweiger, Graz (AT); Martin Winter, Fernitz (AT); Calin Wurm, Ellwangen (DE); Arno Perner, Ellwangen (DE); Thomas Wöhrle, Ellwangen (DE)

(73) Assignee: VW-VM Forschungsgesellschaft mbH & Co. KG (DE)

( * ) Notice: Subject to any disclaimer, the term of this patent is extended or adjusted under 35 U.S.C. 154(b) by 192 days.

(21) Appl. No.: 12/668,916

(22) PCT Filed: Jul. 11, 2008

(86) PCT No.: PCT/EP2008/005673
§ 371 (c)(1),
(2), (4) Date: Jun. 7, 2010

(87) PCT Pub. No.: WO2009/012899
PCT Pub. Date: Jan. 29, 2009

(65) Prior Publication Data
US 2010/0239915 A1   Sep. 23, 2010

(30) Foreign Application Priority Data

Jul. 25, 2007 (DE) ......................... 10 2007 036 653

(51) Int. Cl.
*H01M 4/62* (2006.01)
*H01M 4/525* (2010.01)
*H01M 10/0525* (2010.01)

(52) U.S. Cl.
CPC ........... *H01M 4/621* (2013.01); *H01M 4/525* (2013.01); *H01M 4/622* (2013.01); *H01M 10/0525* (2013.01)

(58) Field of Classification Search
CPC .......... H01M 4/02; H01M 4/58; H01M 4/621; H01M 4/622
(Continued)

(56) References Cited

U.S. PATENT DOCUMENTS 3,877,983 A    4/1975   Hovsepian
5,296,318 A    3/1994   Gozdz et al.
(Continued)

FOREIGN PATENT DOCUMENTS

CN    1622366 A       6/2005
DE    699 00 860 T2   10/2002
(Continued)

OTHER PUBLICATIONS

Lee et al. "Effect of Carboxymethyl Cellulose on Aqueous Processing of Natural Graphite Negative Electrodes and Their Electrochemical Performance for Lithium Batteries." Journal of the Electrochemical Society 152.9 (2005): A1763.*

(Continued)

*Primary Examiner* — James Lee
(74) *Attorney, Agent, or Firm* — DLA Piper LLP (US)

(57) ABSTRACT

An electrode for a lithium ion battery includes a matrix based on at least one polysaccharide and also particles of at least one electrochemically active material which are embedded in the matrix, with the electrode being free of synthetic polymeric compounds. A battery contains the electrode and a polysaccharide is a binder for electrochemically active electrode materials for such an electrode.

18 Claims, 2 Drawing Sheets

(58) Field of Classification Search
USPC .................................. 429/121–347, 231.95
See application file for complete search history.

(56) References Cited

U.S. PATENT DOCUMENTS

| | | | |
|---|---|---|---|
| 6,365,299 B1 | 4/2002 | Miyaki et al. | |
| 6,371,995 B1 | 4/2002 | Yasunami | |
| 6,432,576 B1 | 8/2002 | Hikmet | |
| 6,432,585 B1 | 8/2002 | Kawakami et al. | |
| 7,105,251 B2 | 9/2006 | Miyaki et al. | |
| 7,157,184 B2 | 1/2007 | Wöhrle et al. | |
| 7,267,907 B2 | 9/2007 | Kim | |
| 2002/0177041 A1 | 11/2002 | Wöhrle et al. | |
| 2004/0043293 A1 | 3/2004 | Nagata et al. | |
| 2005/0238958 A1* | 10/2005 | Kim | 429/217 |
| 2008/0311479 A1* | 12/2008 | Lee et al. | 429/232 |

FOREIGN PATENT DOCUMENTS

| | | | | |
|---|---|---|---|---|
| EP | 0 762 521 A2 | 3/1997 | | |
| EP | 0 836 238 A1 | 4/1998 | | |
| EP | 0 895 295 A1 | 2/1999 | | |
| EP | 1 261 048 A2 | 11/2002 | | |
| EP | 1 489 673 A1 | 12/2004 | | |
| JP | 10-233207 | 9/1998 | | |
| JP | 11-219724 | 8/1999 | | |
| JP | 2000-12014 | 1/2000 | | |
| JP | 2004-87227 | 3/2004 | | |
| JP | 2004-146296 | 5/2004 | | |
| JP | 2005-5113 | 1/2005 | | |
| JP | 2005-044814 | 2/2005 | | |
| JP | 2007-87789 | 4/2007 | | |
| JP | 2007-95641 | 4/2007 | | |
| JP | 2008-135334 | * | 6/2008 | H01M 4/02 |
| KR | WO 2008/030001 A1 | * | 3/2008 | H01M 4/62 |

OTHER PUBLICATIONS

Asaoka. JP 2008-135334. Jun. 12, 2008. English machine translation by JPO.*

* cited by examiner

US 9,653,733 B2

ELECTRODES AND LITHIUM-ION CELLS WITH A NOVEL ELECTRODE BINDER

RELATED APPLICATIONS

This is a §371 of International Application No. PCT/EP2008/005673, with an international filing date of Jul. 11, 2008 (WO 2009/012899 A1, published Jan. 29, 2009), which is based on German Patent Application No. 10 2007 036 653.3, filed Jul. 25, 2007, the subject matter of which is incorporated by reference.

TECHNICAL FIELD

This disclosure relates to an electrode, in particular, a lithium ion battery with at least one such electrode and also to a novel use of a polysaccharide.

BACKGROUND

Electrochemical elements such as lithium ion cells generally have composite electrodes containing particles of electrochemically active constituents, a binder and also current collectors. The binder ensures mechanical stability of the electrode; in particular, it should ensure contact of the particles between one another and with the current collector. Decontacting both between individual electrochemically active particles and between the particles and the current collector can occur, for example, due to gas formation in the electrode as a result of decomposition of the electrolyte or due to the electrochemically induced volumetric dynamics of an electrode. Decontacting is frequently associated with gradually increasing decreases in capacity, which can ultimately lead to the electrode concerned becoming unusable.

Binders based on fluorinated polymers and copolymers, in particular binders based on polyvinylidene fluorides (PVdF) and polyvinylidene fluoride-hexafluoropropylene (PVdF-HFP) are known. Electrodes having such binders are described, for example, in EP 1 261 048 and U.S. Pat. No. 5,296,318.

EP 14 89 673 discloses electrodes having a binder based on styrene-butadiene rubber. In the production of the electrodes, sodium carboxymethylcellulose is used to adjust the viscosity.

In an electrode, the polymers or copolymers used as binder usually form a matrix in which the electrochemically active materials are present in finely dispersed form. Commercial electrochemically active materials such as graphite are generally completely insoluble in the polymers and copolymers mentioned. They do not form a firm bond with the binder matrix. Rather, physical attachment, e.g., via adhesion forces, or mechanical attachment occurs. Decreases in capacity as a result of decontacting can in the case of such electrodes frequently be measured after only a few charging and discharging cycles.

From an ecological and economic point of view, the use of the above-mentioned partially fluorinated polymer binders, in particular, is problematic since processing these binders requires the use of organic solvents such as N-methylpyrrolidin-2-one or acetone. Corresponding safety measures and occupational hygiene measures are necessary. The polymer binders dissolve at least partially in these solvents and can then readily be processed further. However, N-methylpyrrolidin-2-one in particular is suspected of being harmful to health. The solvents generally have to be incinerated after use, which results in an increase in carbon dioxide emissions.

It could therefore be helpful to provide batteries which are superior to known batteries in terms of their capacitive performance and their life. In particular, the capacitive performance should decrease less sharply with increasing age of the battery than is the case for known batteries.

SUMMARY

We provide an electrode for a lithium ion battery including a matrix based on at least one polysaccharide and particles of at least one electrochemically active material embedded in the matrix, wherein the electrode is free of synthetic polymeric compounds.

We also provide the electrode, wherein the matrix is based on a cellulose derivative having the formula:

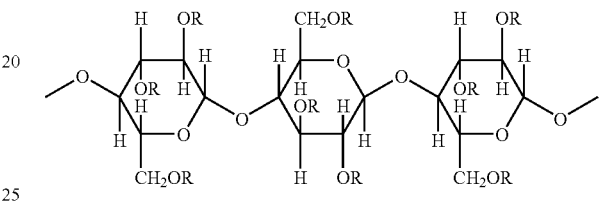

where R comprises at least one member selected from the group consisting of H, $(CH_2)_nOH$, $(CH_2)_nCOOH$, $(CH_2)_nO(CH_2)_nCH_3$, $(CH_2)_nCH_3$, $(CH_2)_nCO(CH_2)_nCH_3$, $(CH_2)_nCHO$, $(CH_2)_nN(COOMe)_2$, $(CH_2)_nCH_3$, $(CH_2)_nCN$ and $(CH_2)_nCOOMe$, where Me is Li, Na, K, Rb, Cs or Ca, n can be from 1 to 10 and at least one radical R is not H.

We further provide a lithium ion battery including at least one electrode.

DETAILED DESCRIPTION

Figure 1:
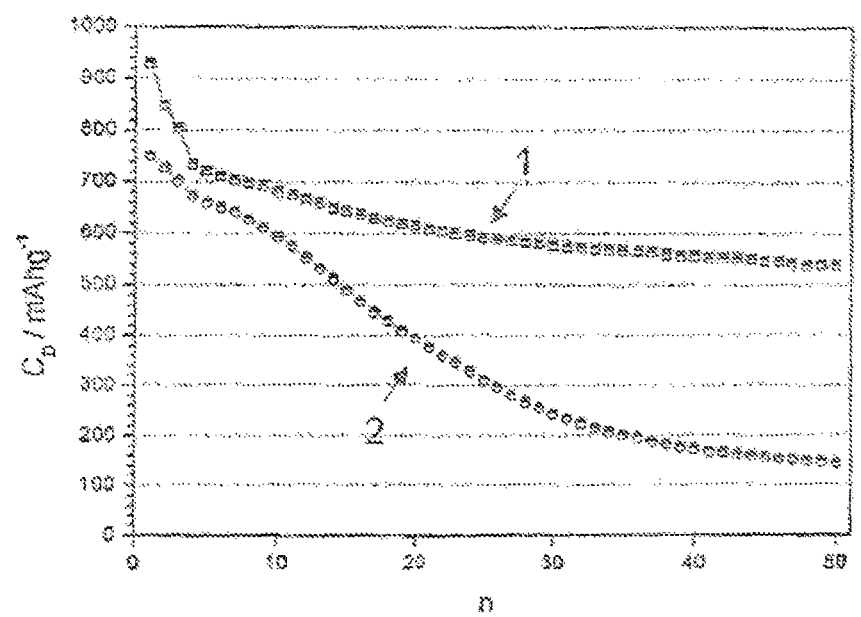
FIG. 1 is a graph of discharge capacity ($C_D$) as a function of the number of cycles (n) for tin-antimony-copper electrodes.

Our electrodes are suitable, in particular, for a lithium ion battery. A lithium ion battery is an electrochemical voltage source based on lithium which, in contrast to many conventional batteries, is rechargeable. Lithium ion batteries exist in various embodiments. One further development is, for example, the lithium polymer battery in which, in particular, a polymer-based electrolyte is used.

Our electrode comprises a matrix based on at least one polysaccharide and particles of at least one electrochemically active material which are embedded in the matrix. Preferably, the electrode is essentially free of fully synthetic polymeric compounds.

As described at the outset, known electrodes have binders composed of synthetic polymers such as the fluoropolymers mentioned or the styrene-butadiene rubber known from EP 14 89 673. It has surprisingly been found that such binders can be replaced completely by a binder based on a biopolymer, namely a binder based on at least one polysaccharide.

The term "essentially free of" is intended, in connection with the proportion of synthetic polymeric compounds in an electrode, to mean that these are present at most in very small amounts which are in themselves not sufficient to be able to perform a binder function, for example, in amounts of less than 0.1% by weight (based on the solids content of the electrode). Our electrodes are particularly preferably completely free of synthetic polymeric compounds.

The term "synthetic polymeric compounds" refers to polymeric compounds which cannot be prepared by modification of natural polymers but instead are, in particular, fully synthetic. Examples of synthetic polymeric compounds are, in particular, substituted and unsubstituted polyolefins or silicones.

The matrix based on at least one polysaccharide of an electrode forms a three-dimensional structure within which the electrochemically active particles are preferably homogeneously distributed. The term "matrix" thus simply refers to a material in which particles of one or more further materials are embedded.

The term "electrochemically active material" refers to a material which participates directly in the electrochemical processes in the electrode, in particular a material which can incorporate and release lithium ions reversibly.

Preferably, our electrodes are characterized in that at least part of the particles are joined to the matrix via covalent bonds.

The term "covalent bond" refers, in particular, to a chemical bond which has been formed via a condensation reaction, particularly preferably via a condensation reaction with elimination of water. Accordingly, the binding partners (matrix or matrix-forming polysaccharide and particles) have, preferably, functional groups which can undergo condensation reactions with one another (which will be discussed in more detail later).

The covalent bond between the particles and the matrix results in a particularly strong and resistant electrode structure which can easily withstand the mechanical stresses within the electrode during charging and discharging processes. This has, in particular, an advantageous effect on the life of an electrode.

Preference is given to at least part of the particles comprising a carbon-based, lithium-intercalating material or consisting at least partly of the latter. This applies particularly when the electrode is a negative electrode (anode). The carbon-based, lithium-intercalating material is preferably graphite.

Suitable lithium-intercalating materials which are not based on carbon can also be used. These can be used either in combination with a carbon-based lithium-intercalating material or alone.

Suitable carbon-based lithium-intercalating materials and lithium-intercalating materials which are not based on carbon are known in principle to those skilled in the art and require no further explanation.

Preference is given to at least part of the particles of the carbon-based, lithium-intercalating material having an average particle size in the range from 1 µm to 50 µm, in particular from 4 µm to 30 µm.

Preferably, the electrodes are provided for at least part of the particles to comprise a metal and/or semimetal (or consist at least partly thereof) which can form an alloy with lithium. This, too, applies particularly when the electrode is a negative electrode.

Preference is given to at least part of the particles of the metal and/or semimetal having an average particle size of less than 1 µm.

The metal and/or semimetal mentioned is in particular aluminum, silicon, antimony, tin, cobalt or a mixture thereof. As mixture, particular preference is given to a tin/antimony mixture or a tin/cobalt mixture.

The electrode can be based exclusively on the carbon-based, lithium-intercalating material mentioned or on a metal and/or semimetal which can form an alloy with lithium.

The electrode preferably has both particles comprising a carbon-based, lithium-intercalating material and particles which comprise a metal and/or semimetal. The mixing ratio of the particles of the carbon-based, lithium-intercalating material and the particles comprising a metal and/or a semimetal is in these cases particularly preferably in the range from 1:1 to 9:1.

Preferably, the electrodes have particles which comprise a metal and/or semimetal and whose surface is at least partially oxidized.

Metallic and semimetallic particles can have OH groups (hydroxyl groups) on their surface when the surface is at least partially oxidized. This case can occur, in particular, when the particles are brought into contact with water. Further substances having suitable functional groups can in principle bind to the surface of the metallic or semimetallic particles via such OH groups, in particular, by means of a condensation reaction with elimination of water. This is in the present case also the preferred way of forming the above-mentioned covalent bond between the particles and the matrix. Thus, metallic or semimetallic particles, for example particles of a tin-antimony alloy or of silicon, can be introduced together with a matrix-forming polysaccharide into water or into an aqueous solution (a solids content in the range from 15 to 45% by weight is preferred here). If appropriate, surfactants can be added in small amounts. The particles can then oxidize on the surface and OH groups can be formed on the surface. The condensation reaction which has already been mentioned a number of times can then take place with the matrix-forming polysaccharide.

Preferably, the electrodes have particles which consist at least partially, preferably entirely, of lithium cobalt oxide. This is the case particularly when the electrode is a positive electrode. Since particles based on lithium cobalt oxide ($LiCoO_2$) are oxidic in nature, they too can bind to a matrix of a polysaccharide, if appropriate via a condensation reaction.

In addition to the particles based on lithium cobalt oxide or as an alternative to these, an electrode can also have lithium metal oxides of the general formula $LiMO_2$ (where M=at least one metal from the group consisting of Co, Mn, Ni and V) and/or $LiMPO_4$ (where M=Fe and/or Mn) as active material.

Suitable polysaccharides include, in particular, polysaccharides modified with reactive groups, where the reactive groups are, in particular, functional groups which can undergo a condensation reaction with OH groups. The reactive groups are particularly preferably hydroxy, carboxyl, carboxylate, carbonyl, cyano, sulfonic acid, halocarbonyl, carbamoyl, thiol and/or amino groups.

Polysaccharides are polymeric sugars composed of monosaccharide units and generally have a random molecular size distribution. Here, a plurality of monosaccharides (e.g., glucose or fructose) form a chain. Particular preference is given to polysaccharides of the general formula $-[C_x(H_2O)_y]_n-$ where x=5 or 6 and y=x-1.

The matrix of an electrode preferably consists at least partly of a polysaccharide having from 50 to 10 000 monosaccharide units.

Preferably, the matrix of the electrode consists at least partly, preferably entirely, of a cellulose derivative. The cellulose derivative is, preferably, present in salt-like form, in particular as alkali metal, alkaline earth metal or ammonium salt.

Cellulose is an unbranched polysaccharide which is generally made up of from several 100 to 10 000 β-D-glucose molecules linked via β-(1,4)-glucosidic bonds. Cellulose is insoluble in water and in most organic solvents. For this reason, water-soluble derivatives of cellulose or derivatives of cellulose which are at least swellable in water are particularly preferred.

The matrix is particularly preferably based on a cellulose derivative of the following formula:

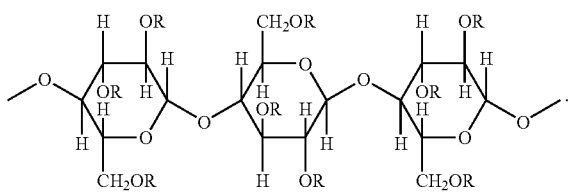

R here comprises, in particular, at least one member of the group consisting of H, $(CH_2)_nOH$, $(CH_2)_nO(CH_2)_nCH_3$, $(CH_2)_nCO(CH_2)_nCH_3$, $(CH_2)_nCHO$, $(CH_2)_nCOOH$, $(CH_2)_nN(COOMe)_2$, $(CH_2)_nCH_3$, $(CH_2)_nCN$ and $(CH_2)_nCOOMe$, where Me is Li, Na, K, Rb, Cs or Ca, n can be from 1 to 10 and at least one radical R is not H.

The electrodes particularly preferably have a matrix based on at least one carboxyalkylcellulose, preferably carboxymethylcellulose and/or carboxyethylcellulose, in particular carboxymethylcellulose.

Carboxymethylcelluloses are known derivatives of cellulose in which at least part of the OH groups of the cellulose are linked by ether bonds to a carboxymethyl group. To produce carboxymethylcellulose, cellulose is generally converted in a first step into reactive alkali metal cellulose and subsequently reacted with chloroacetic acid to form carboxymethylcellulose. The cellulose structure is retained in this procedure. Especially under alkaline conditions, carboxyalkylcelluloses are generally relatively soluble in water.

Our electrodes preferably have a matrix based on sodium carboxyalkylcellulose, in particular based on sodium carboxymethylcellulose.

Preference is given to cellulose derivatives having a degree of substitution in the range from 0.5 to 3, in particular from 0.8 to 1.6. The degree of substitution indicates the average number of modified hydroxyl groups per monosaccharide unit in a cellulose derivative. Since three hydroxyl groups per monosaccharide unit in the cellulose are available for a reaction, the maximum achievable degree of substitution is in the present case 3.

Furthermore, our electrodes preferably have a conductivity improver. Suitable conductivity improves are, in particular, carbon black, graphite or a mixture of the two.

Furthermore, our electrodes generally have a current collector, in particular a metallic current collector. If the electrode is a negative electrode, current collectors composed of copper are preferred. In the case of a positive electrode, current collectors composed of aluminum are preferred.

If the electrode has a cellulose derivative as the at least one polysaccharide, the cellulose derivative is preferably present in a proportion of from 1% by weight to 15% by weight, in particular from 2% by weight to 8% by weight, in the electrode (in each case based on the solids content of the electrode).

Furthermore, it is preferred for the electrode to have an organic electrolyte comprising a lithium-based electrolyte salt, for example lithium tetrafluoroborate.

We likewise provide a battery, in particular a lithium ion battery, which comprises at least one electrode.

The battery preferably has a single cell having at least one positive electrode and at least one negative electrode between which a separator is arranged. Preferably, the battery has a plurality of single cells.

Both the at least one positive electrode and the at least one negative electrode can have a matrix based on at least one polysaccharide.

The electrodes and the matrix have been described comprehensively above, and the relevant sections of the description are hereby incorporated by reference.

Furthermore, we provide for the use of a polysaccharide as binder for electrochemically active electrode materials. As mentioned above, we surprisingly found that conventional binders can be replaced completely by binders based on at least one polysaccharide. Preferably, the at least one polysaccharide is used as binder in electrode compositions which are free of synthetic polymeric compounds.

Polysaccharides which can preferably be used, in particular the salt-like cellulose derivatives which can preferably be used, have been comprehensively described above. To avoid repetition, the relevant passages are here also expressly incorporated by reference.

Further features may be derived from the drawings. Here, individual features can in each case be realized either alone or in combination with one another. The preferred aspects described serve merely for the purposes of illustration and to provide better understanding and do not constitute any restriction.

EXAMPLE 1

To produce a negative electrode, 8% by weight of sodium carboxymethylcellulose (Walocell® CRT10G) are introduced into water and allowed to swell fully. A mixture of power outlet lead threads composed of copper (35% by weight) and nanoparticulate active composition (tin-antimony, 65% by weight) is introduced in an amount of 92% by weight. The electrode paste obtained in this way is applied in a thickness of 200 μm by means of a doctor blade to a copper foil.

Negative electrodes produced in this way are characterized in 3-electrode Swagelok-type cells having 6 nonwoven separators (Freudenberg 2190) and a Celgard 2400 against lithium (as positive electrode). A standard mixture of fluorinated electrolyte salts in organic solvents serves as electrolyte mixture.

The discharge capacities $C_D$ of the tin-antimony-copper electrodes, based on the active composition of the electrode, are shown as a function of the number of cycles n in FIG. 1. Discharging is carried out at room temperature at a current having a magnitude of 1 C (950 mA/g).

Curve 1 characterizes the anode material produced using the novel binder system.

Curve 2 shows, in comparison, the capacity and its decrease with number of cycles for a comparable anode in which 8% by weight of PVdF-HFP copolymer processed in NMP were used in place of the sodium carboxymethylcellulose.

EXAMPLE 2

To produce silicon-graphite composite anodes, 8% by weight of sodium carboxymethylcellulose (Walocell® CRT2000PPA12) are introduced into water and allowed to swell fully. Furthermore, 20% of nanoparticulate silicon (Nanostructured and Amorphous Materials Los Alamos) and 5% of carbon nanofibers (Electrovac AG, LHT-XT) are introduced sequentially and dispersed with a high energy input. 5% of conductive carbon black (Super P) and 62% of graphite (natural graphite, potato shaped) are finally introduced and dispersed.

The electrode paste obtained in this way is applied in a thickness of 200 μm by means of a doctor blade to a copper foil (Schlenk).

The anodes are characterized in 3-electrode Swagelok-type cells having 6 nonwoven separators (Freudenberg 2190) and a Celgard 2400 against lithium. A standard mixture of fluorinated electrolyte salts in organic solvents serves as electrolyte mixture.

Figure 2:
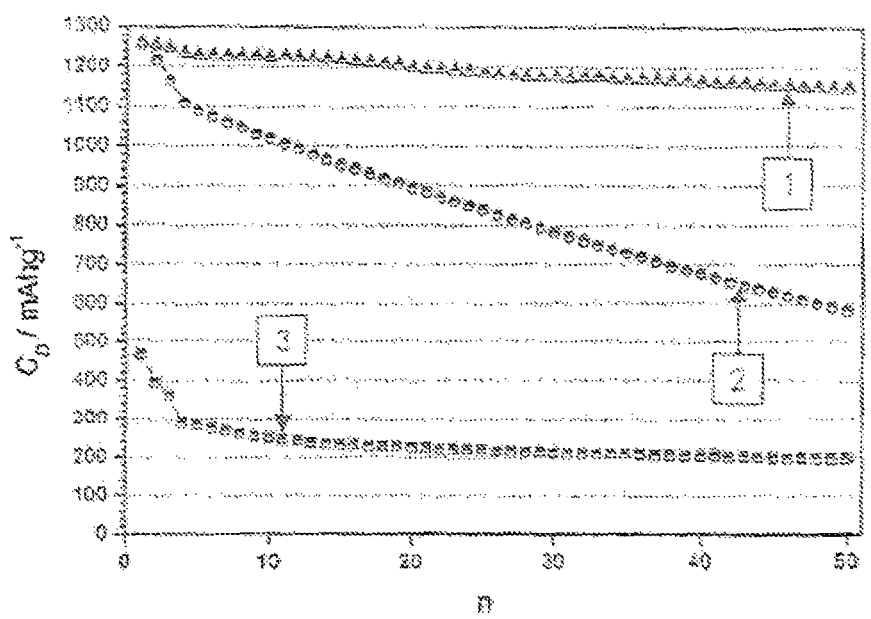
FIG. 2 is a graph of discharge capacity ($C_D$) as a function of the number of cycles (n) for silicon-graphite anodes.

FIG. 2 shows the discharge capacities $C_D$ of the silicon-graphite anodes produced in this way based on the active composition of the electrode as a function of the number of cycles n. Discharging is carried out at room temperature at a current having a magnitude of IC (1250 mA/g).

Curve 1 shows the decrease in discharge capacity of the anode produced using the novel binder with increasing number of cycles n.

Curve 2 shows, in comparison, the capacity and its decrease with increasing number of cycles of an anode produced using 4% by weight of styrene-butadiene rubber (SBR) as binder and 4% of Na carboxymethylcellulose as dispersant.

Curve 3 describes the capacitive characteristics of a silicon-graphite composite anode in which 10% by weight of PVdF-HFP copolymer as support polymer processed in NMP was used.

The invention claimed is:

1. An electrode for a lithium ion battery comprising a matrix based on at least one polysaccharide and particles of at least one electrochemically active material embedded in the matrix, wherein 1) at least part of the particles comprise at least one metal and/or semimetal selected from the group consisting of aluminum, silicon, antimony, tin and cobalt which can form an alloy with lithium, 2) surfaces of the particles comprising a metal and/or a semimetal are oxidized, and 3) the matrix contains within an amount of synthetic polymeric compounds greater than 0% by weight and up to 0.1% by weight.

2. The electrode as claimed in claim 1, wherein at least part of the particles are bound via covalent bonds to the matrix.

3. The electrode as claimed in claim 1, wherein at least part of the particles comprise a carbon-based, lithium-intercalating material.

4. The electrode as claimed in claim 1, wherein the at least one polysaccharide is modified with reactive groups which can undergo a condensation reaction with OH groups.

5. The electrode as claimed in claim 4, wherein the reactive groups are hydroxy, carboxyl, carboxylate, carbonyl, cyano, sulfonic acid, halocarbonyl, carbamoyl, thiol and/or amino groups.

6. The electrode as claimed in claim 1, wherein the matrix has a polysaccharide composed of from 50 to 10 000 monosaccharide units.

7. The electrode as claimed in claim 1, wherein the matrix has a cellulose derivative as polysaccharide.

8. The electrode as claimed in claim 1, wherein the matrix is based on a cellulose derivative having the formula:

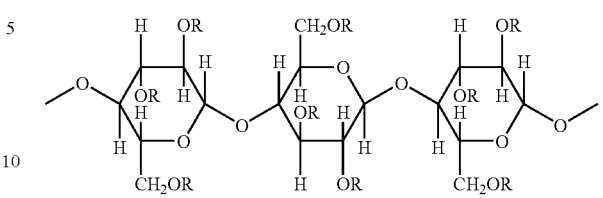

where R comprises at least one member selected from the group consisting of H, $(CH_2)_nOH$, $(CH_2)_nCOOH$, $(CH_2)_nO(CH_2)_nCH_3$, $(CH_{2n}CO(CH_2)_nCH_3$, $(CH_2)_nCHO$, $(CH_2)_nN(COOMe)_2$, $(CH_2)_nCH_3$, $(CH_2)_nCN$ and $(CH_2)_nCOOMe$, where Me is Li, Na, K, Rb, Cs or Ca, n can be from 1 to 10 and at least one radical R is not H.

9. The electrode as claimed in claim 1, wherein the polysaccharide is a carboxymethylcellulose and/or a carboxyethylcellulose.

10. The electrode as claimed in claim 9, wherein the polysaccharide is present in a proportion of from 1% by weight to 15% by weight based on the solids content of the electrode.

11. The electrode as claimed in claim 9, wherein the polysaccharide has a degree of substitution in the range from 0.5 to 3.

12. The electrode as claimed in claim 1, further comprising an organic electrolyte containing a lithium-based electrolyte salt.

13. A lithium ion battery comprising at least one electrode as claimed in claim 1.

14. The electrode as claimed in claim 1, wherein the polysaccharide is a binder.

15. The electrode as claimed in claim 14, wherein the polysaccharide is water-soluble.

16. The electrode as claimed in claim 1, wherein the electrode is a negative electrode.

17. An electrode for a lithium ion battery comprising a matrix based on at least one polysaccharide binder and particles of at least one electrochemically active material embedded in the matrix, wherein 1) at least part of the particles comprise at least one metal and/or semimetal selected from the group consisting of aluminum, silicon, antimony, tin and cobalt which can form an alloy with lithium, 2) surfaces of the particles comprising a metal and/or a semimetal are oxidized, 3) the matrix contains within an amount of synthetic polymeric compounds greater than 0% by weight and up to 0.1% by weight, and 4) the binder is modified with at least one reactive group selected from the group consisting of carbonyl, cyano, sulfonic acid, halocarbonyl, carbamoyl, thiol and amino.

18. An electrode for a lithium ion battery comprising a matrix based on at least one polysaccharide and particles of at least one electrochemically active material embedded in the matrix, wherein 1) at least part of the particles comprise at least one metal and/or semimetal selected from the group consisting of aluminum, silicon, antimony, tin and cobalt which can form an alloy with lithium, 2) surfaces of the particles comprising a metal and/or a semimetal are oxidized, 3) the matrix contains within an amount of synthetic polymeric compounds greater than 0% by weight and up to 0.1% by weight, and 4) the polysaccharide is based on a cellulose derivative having the formula:

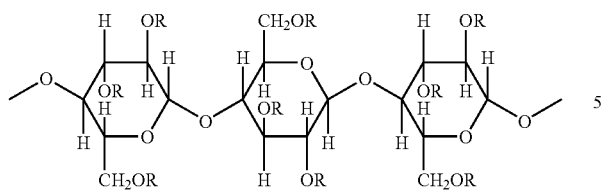
where R comprises at least one member selected from the group consisting of $(CH_2)_n N(COOMe)_2$ and $(CH_2)_n COOMe$, where Me is Li or K, and n can be from 1 to 10.
* * * * *